United States Patent
Ado

(10) Patent No.: US 8,047,437 B2
(45) Date of Patent: Nov. 1, 2011

(54) CARD ACCESS APPARATUS AND ELECTRONIC APPARATUS IMPLEMENTING THE SAME

(75) Inventor: Keitaro Ado, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 1029 days.

(21) Appl. No.: 10/562,439

(22) PCT Filed: Apr. 25, 2005

(86) PCT No.: PCT/JP2005/008316
§ 371 (c)(1),
(2), (4) Date: May 18, 2006

(87) PCT Pub. No.: WO2005/106777
PCT Pub. Date: Nov. 10, 2005

(65) Prior Publication Data
US 2006/0237538 A1    Oct. 26, 2006

(30) Foreign Application Priority Data
Apr. 30, 2004  (JP) .................... 2004-136091

(51) Int. Cl.
*G06K 7/06*   (2006.01)
(52) U.S. Cl. .......... 235/441; 710/15; 710/310; 713/300
(58) Field of Classification Search ............ 235/441; 710/15, 310; 713/300
See application file for complete search history.

(56) References Cited

U.S. PATENT DOCUMENTS

| | | | |
|---|---|---|---|
| 6,663,007 B1 | 12/2003 | Sun et al. | |
| 7,075,793 B2* | 7/2006 | Le et al. | 361/737 |
| 2002/0046877 A1* | 4/2002 | Hirai et al. | 174/250 |
| 2003/0233507 A1* | 12/2003 | Yu et al. | 710/310 |
| 2004/0153582 A1* | 8/2004 | Oyama et al. | 710/15 |
| 2007/0136616 A1* | 6/2007 | Kurakata et al. | 713/300 |
| 2008/0320337 A1* | 12/2008 | Pratt et al. | 714/42 |
| 2009/0100207 A1* | 4/2009 | Jones et al. | 710/301 |

FOREIGN PATENT DOCUMENTS

| | | |
|---|---|---|
| JP | 2001-184462 A | 7/2001 |
| JP | 2003-044795 A | 2/2003 |
| JP | 2003-044796 A | 2/2003 |
| JP | 2003-157130 A | 5/2003 |
| JP | 2003-178269 A | 6/2003 |
| JP | 3095219 U | 7/2003 |

* cited by examiner

*Primary Examiner* — Allyson Trail
(74) *Attorney, Agent, or Firm* — Dickstein Shapiro LLP

(57) ABSTRACT

A card access apparatus is provided that is adapted to be connected to plural types of cards, the apparatus including plural connection points adapted for the respective types of cards, and plural signal buses that connect the connection points to a card control unit. When one type of card is connected to its corresponding connection point, at least one signal bus connected to a connection point adapted for at least one other type of card is electrically isolated from its corresponding connection point.

13 Claims, 5 Drawing Sheets

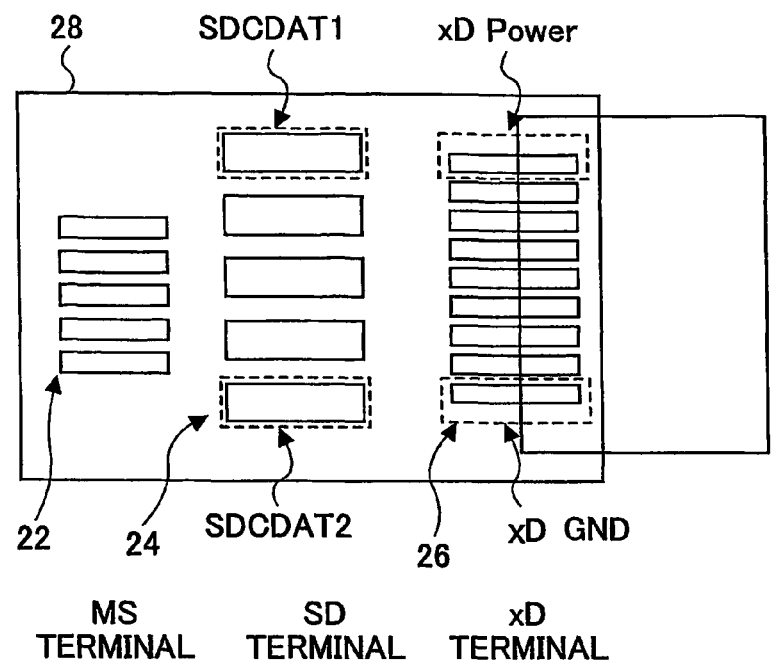
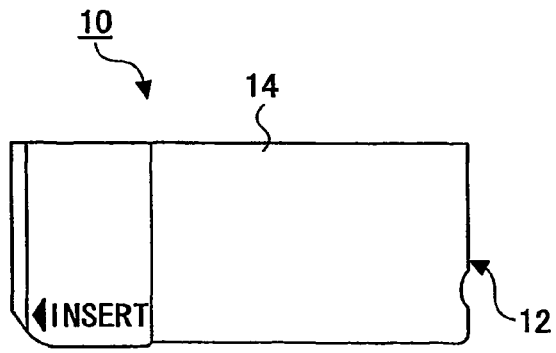
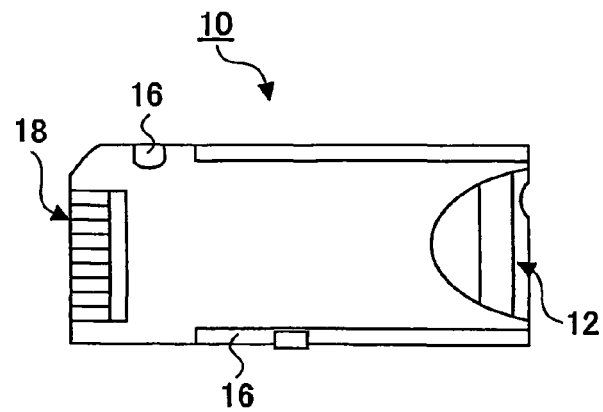

CARD ACCESS APPARATUS AND ELECTRONIC APPARATUS IMPLEMENTING THE SAME

TECHNICAL FIELD

The present invention relates to a card access apparatus for accessing a memory card that is used as a storage medium for a personal computer or digital camera, for example, and an electronic apparatus implementing such an access apparatus.

BACKGROUND ART

Presently, there are various types of small memory cards that are used as a storage medium for a personal computer or a digital camera, for example. Such memory cards include a Memory Stick (registered trademark; referred to as 'MS' hereinafter), an SD Card (registered trademark; referred to as 'SD' hereinafter), and an xD-Picture Card (registered trademark; referred to as 'xD' hereinafter), for example.

It is noted that a combo connector that is adapted for use with plural types of such small memory cards is provided. FIGS. 1A~1C show an exemplary configuration of a combo connector 28 that is adapted to be connected to an MS, an SD, or an xD (MS/SD/xD combo connector). As is shown in the drawings, an MS, an SD, or an xD may be selectively connected to the combo connector 28.

It is noted that standardization and application of a so-called 'MS Duo' that is further reduced in size compared to the MS is being developed, and in turn, a so-called 'MS Duo adapter' is provided. By inserting an MS Duo into an MS Duo adapter, and inserting the MS duo adapter with the MS Duo into the MS/SD/xD combo connector 28, the MS Duo may be used as a small memory card for a personal computer or a digital camera, for example.

FIGS. 2A and 2B are diagrams respectively showing a front side configuration and a back side configuration of an MS Duo adapter 10. At a tip portion of the MS Duo adapter 10, a connection terminal 18 is provided as is shown in FIG. 2B. The MS Duo adapter 10 is designed to have a predetermined thickness and includes a slot 12 into which the MS Duo is inserted and set. A large portion of the front surface of the MS Duo adapter 10 and a portion of the back surface of the MS Duo adapter 10 are made of a metal plate 14 having an insulating film formed thereon. For example, the metal plate 14 may correspond to a metal plate made of an aluminum alloy that is coated with an insulating material.

It is noted that when the MS Duo adapter 10 is inserted into the MS/SD/xD combo connector 28, friction may be generated between the metal plate 14 of the MS Duo adapter 10 and the inner surface of a slot of the combo connector 28. In such a case, when the MS Duo adapter is repeatedly inserted into the combo connector 28, the insulator coating of the metal plate 14 of the adapter 10 may be partially rubbed off by the friction.

FIGS. 1A~1C are plan views respectively showing cases in which an MS Duo adapter 10, an SD, and an xD are connected to the MS/SD/xD combo connector 28. It is noted that the MS/SD/xD combo connector 28 is arranged to include only one slot so that only one memory card can be used at one time.

The MS/SD/xD combo connector 28 includes terminals for an MS (MS terminals 22), terminals for an SD (SD terminals 24), and terminals for an xD (xD terminals 26) within one card insertion portion. Accordingly, when an MS Duo adapter 10 with the insulator coating rubbed off from its metal plate 14 as is described above is inserted into the MS/SD/xD combo connector 28, the conductor exposed portion of the MS Duo adapter 10 may come into contact with the SD terminals 24 and/or the xD terminals 26 (or portions thereof). As a result, irregularities may occur in the operation of the personal computer or digital camera, for example, to which the MS/SD/xD combo connector 28 is connected.

For example, a portion of the SD terminals 24 that may come into contact with the metal plate 14 includes terminals associated with data (SDCDAT1 and SDCDAT2), and thereby, when a short circuit occurs between the terminals relating to data and the metal plate 14, irregularities may occur in the operation of terminals relating to data of the MS terminals 22, and the memory card may not operate properly. Also, a portion of the xD terminals 26 that may come into contact with the metal plate 14 includes terminal associated with a power circuit and the ground (xD Power and xD GND), and when a short-circuit occurs between the terminals associated with the power circuit and the ground and the metal plate 14, a catastrophic impact may be imposed on the overall system.

It is noted that various techniques are disclosed in the prior art relating to apparatuses that are capable of handling plural media. For example, Japanese Laid-Open Patent Publication No. 2003-44795 discloses a data processing apparatus that is adapted to plural types of media. However, the disclosed apparatus is merely arranged to prevent an external force from working on a smart media (SM) card. Japanese Laid-Open Patent Publication No. 2003-44796 discloses a memory card read/write apparatus. However, the disclosed apparatus is merely arranged to prevent a CF card or an SM card from being pulled out (detached) before power is turned off. Japanese Laid-Open Patent Publication No. 2003-178269 discloses a passive flash media adapter system. However, the disclosure merely relates to media recognition and access methods for a passive adapter.

DISCLOSURE OF THE INVENTION

It is an object of the present invention to provide a card access apparatus for enabling a personal computer or a digital camera, for example, to selectively access data of plural types of memory cards without encountering failure such as a short circuit. It is another object of the present invention to provide an electronic apparatus that implements such a card access apparatus.

According to an aspect of the present invention, a card access apparatus is provided that that is adapted to be connected to plural types of cards, the apparatus including:

plural connection points adapted for the respective types of cards; and plural signal buses that connect the connection points to a card control unit;

wherein when one type of card is connected to its corresponding connection point, at least one signal bus connected to a connection point adapted for at least one other type of card is electrically isolated from its corresponding connection point.

According to a preferred embodiment of the present invention, the card access apparatus further includes an isolator that is configured to electrically isolate the signal bus connected to the connection point adapted for the at least one other type of card from its corresponding connection point, wherein when the one type of card is not connected to its corresponding connection point, the isolator is arranged to be in an open state.

According to another preferred embodiment of the present invention, when the one type of card is connected to its corresponding connection point, the isolator is arranged to be in a closed state.

According to another preferred embodiment of the present invention, the isolator realizes a separate circuit with respect to the card control unit.

According to another preferred embodiment of the present invention, the isolator is integrated into the card control unit.

According to another preferred embodiment of the present invention, the one type of card includes a metal plate having an insulator coating applied thereon, and the isolator is provided for the signal bus connected to the connection point adapted for the at least one other type of card when there is a risk of a short circuit occurring at the connection point adapted for the at least one other type of card upon connecting the one type of card to its corresponding connection point.

According to another preferred embodiment of the present invention, the one type of card is connected to its corresponding connection point by a connecting unit that includes a metal plate having an insulator coating applied thereon, and the isolator is provided for the signal bus connected to the connection point adapted for the at least one other type of card when there is a risk of a short circuit occurring at the connection point adapted for the at least one other type of card upon connecting the one type of card to its corresponding connection point.

According to another preferred embodiment of the present invention, the signal buses include plural card detection signal buses for the respective types of cards, and when at least one card detection signal of at least one of the card detection signal buses for at least one of the types of cards is set to a non-detection state and the isolator is provided for at least one of the signal buses associated with said at least one of the types of cards, the isolator is arranged to be in an open state.

According to another preferred embodiment of the present invention, when said at least one card detection signal of said at least one of the card detection signal buses is set to a card detection state, the isolator is arranged to be in a closed state.

According to another preferred embodiment of the present invention, the signal buses include at least one power circuit signal bus, the isolator is provided for said at least one power circuit signal bus, and the card control unit controls a power circuit and the isolator to secure a predetermined access period upon detecting a card detection signal state change from a card detection state to a non-detection state in one of the card detection signal buses.

According to another preferred embodiment of the present invention, the signal buses include at least one power circuit signal bus, the isolator is provided for said at least one power circuit signal bus, and the card control unit controls a power circuit to prevent access upon detecting a card detection signal state change from a card detection state to a non-detection state in one of the card detection signal buses.

According to an aspect of the present invention, an electronic apparatus that implements a card access apparatus of the present invention is provided.

According to an aspect of the present invention, when one type of card is connected to its corresponding connection point of a card access apparatus, one or more signal buses that are connected to connection points for other types of cards may be electrically isolated so that occurrence of failure such as a short circuit may be prevented.

BRIEF DESCRIPTION OF THE DRAWINGS

FIGS. 1A~1C are diagrams showing a configuration of a connector for a small memory card;

FIGS. 2A and 2B are diagrams respectively showing front side and back side configurations of an MS Duo adapter;

BEST MODE FOR CARRYING OUT THE INVENTION

In the following, preferred embodiments of the present invention are described with reference to the accompanying drawings.

Figure 3:
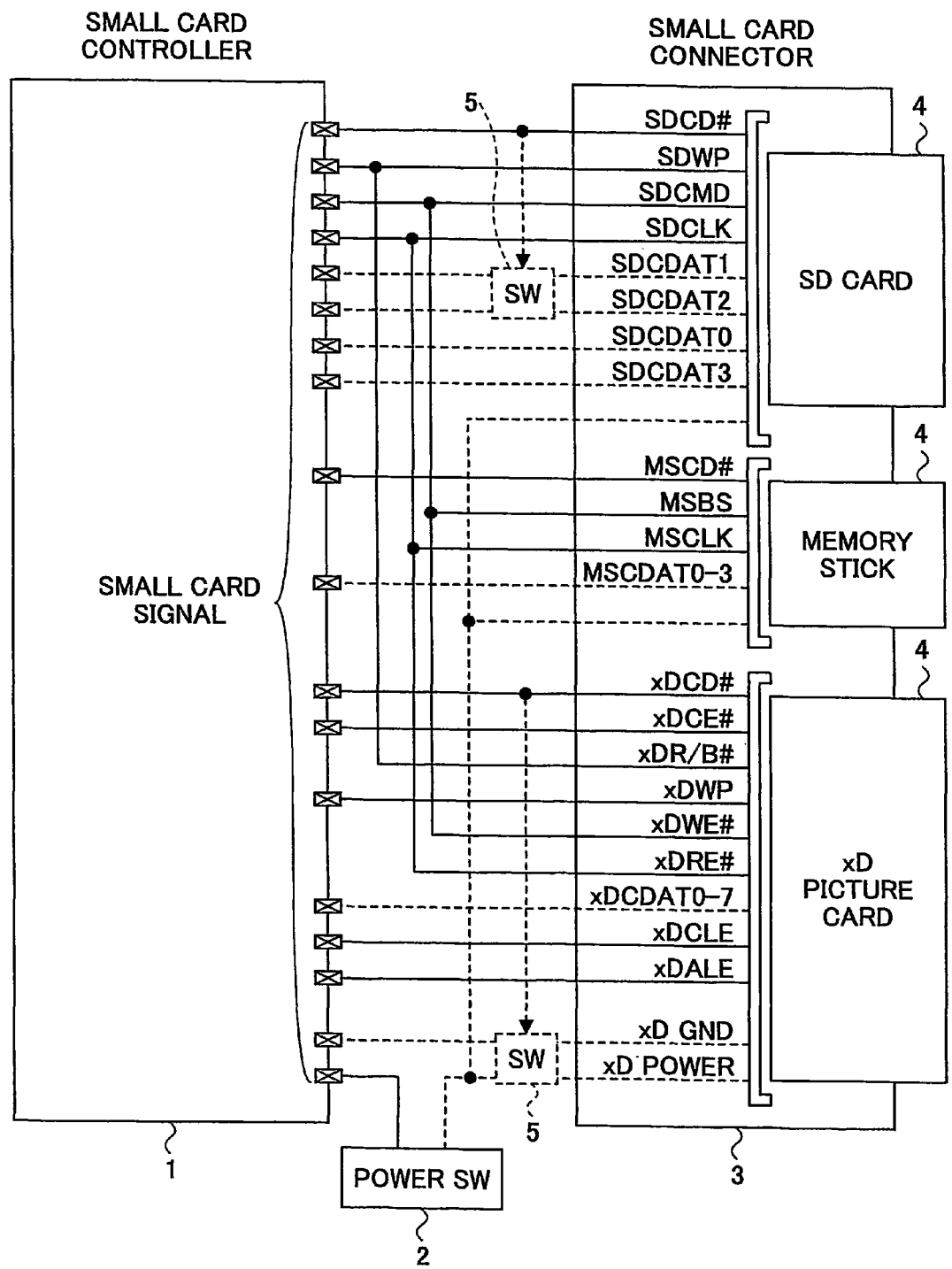
FIG. 3 is a diagram showing a small memory card connector, a small memory card controller and bus connections according to an embodiment of the present invention.

FIG. 3 is a diagram showing a small memory card connector 3, a small memory card controller 1, and bus connections according to an embodiment of the present invention.

Figure 1A:
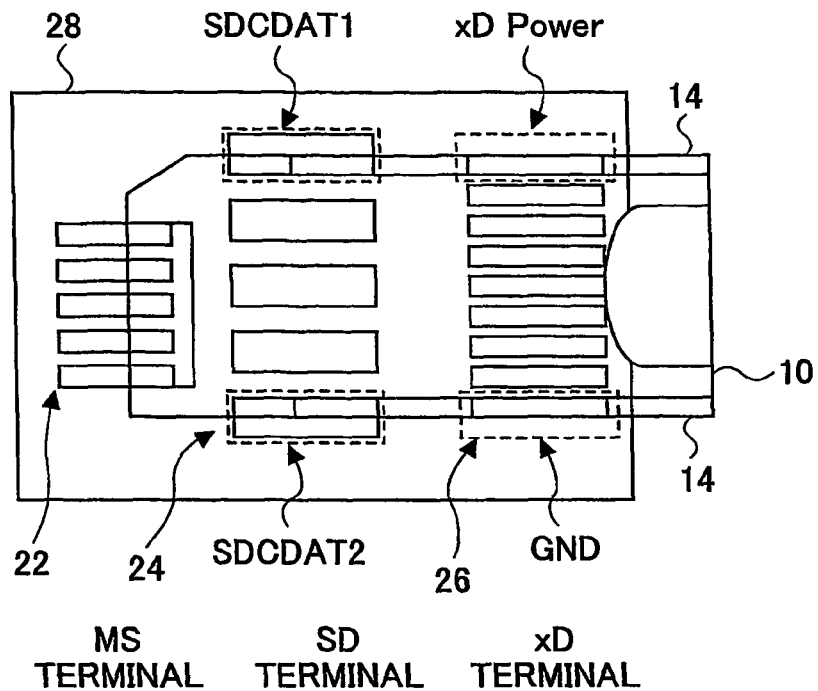
Figure 1B:
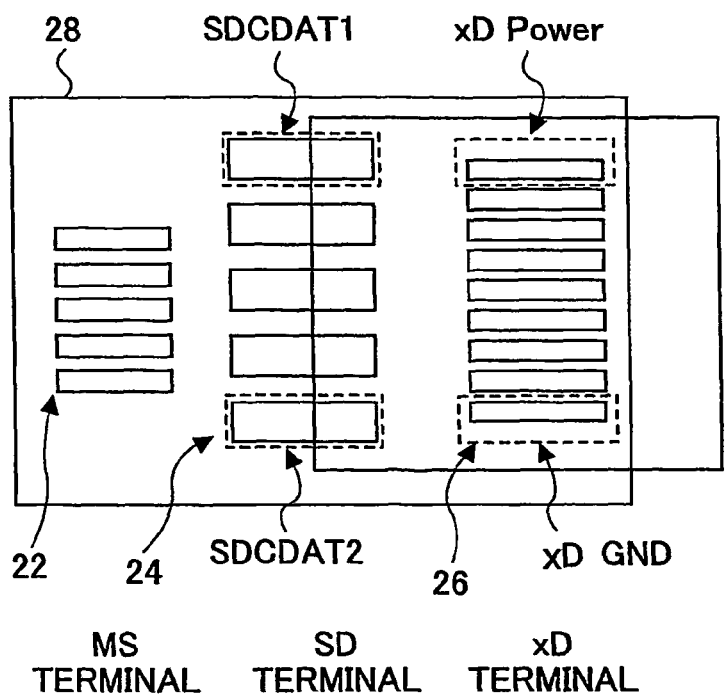

The small memory card connector 3 is adapted to accommodate an MS, an SD, or an xD, as is described in FIG. 1. It is noted that in FIG. 3, three cards, namely, an SD, an MS, and an xD, are indicated at the same time; however, in the present example, only one of these cards may be connected to the small memory card connector 3 at one time.

Also, it is noted that the MS duo may be connected to the small memory card connector 3 using the MS Duo adapter 10. The small memory card controller 1 corresponds to a unit for controlling access to a small memory card 4.

The small memory card connector 3 includes pins (buses) for generating a card detection signal indicating the detection of the small memory card 4 inserted thereto. When the small memory card 4 is inserted into the small memory card connector 3, the bus corresponding to the type of the inserted small memory card 4 may be switched to a card detection state (i.e., the card detection signal corresponding to the type of the inserted small memory 4 is asserted). In the illustrated example of FIG. 3, MSCD# for the MS, SDCD# for the SD, and xDCD# for the xD are provided as card detection signals. Also, at the external side of the small memory card controller 1, a power circuit (Power SW) 2 is provided. When one of the card detection signals is asserted, the small memory card controller 1 detects the assertion of the corresponding card detection signal, and the small memory card controller 1 controls the power circuit 2 to supply power to the small memory card 4.

According to an embodiment, an isolator 5 is provided on one or more signal buses at which a short circuit may occur when an MS Duo adapter 10 having the insulator coating rubbed off from its metal plate 14 is inserted into the small memory card connector 3. In the illustrated example of FIG. 3, data signal buses for signals SDCDAT1 and SDCDAT2 of the SD may come into contact with the metal plate 14 (i.e., conductor exposed portion thereof) to induce a short-circuit, and therefore, an isolator 5 is provided at the SD data signal buses. Also, power circuit signal buses for the signals xD Power and xD GND of the xD may come into contact with the metal plate 14 (conductor exposed portion thereof) to induce a short circuit, and therefore, an isolator 5 is provided at the xD power circuit signal buses. It is noted that the respective isolators 5 provided at the signal buses are controlled to be opened and closed according to the card detection signals corresponding to the respective types of small memory cards.

It is noted that in one embodiment, the isolators 5 may correspond to analog switch circuits SW as is shown in FIG. 3.

In the illustrated example of FIG. 3, when no small memory card 4 is inserted into the structure of the small memory card connector 3 and controller 1, the two isolators (SW) 5 are opened. The two isolators (SW) 5 remain opened when an MS duo adapter or an MS is inserted, and thereby, the generation of short circuits occurring between the metal plate 14 and the SD terminals 24 and/or the xD terminals 26 may be prevented.

When an SD is inserted into the connector 3 and the SD card detection signal is detected, the isolator (SW) 5 at the SD signal buses that may be shorted with the metal plate 14 of the MS Duo adapter 10 (e.g., SD data signal buses for SDCDAT1 and SDCDAT2 in FIG. 3) is closed. When the SD is detached, the isolator (SW) 5 is re-opened.

When an xD is inserted into the connector 3 and the xD card detection signal is detected, the isolator (SW) of the xD signal buses that may be shorted with the metal plate 14 of the MS Duo adapter 10 (e.g., xD power circuit signal buses for xD Power and xD GND in FIG. 3) is closed. When the xD is detached, the isolator (SW) 5 is re-opened.

Figure 4:
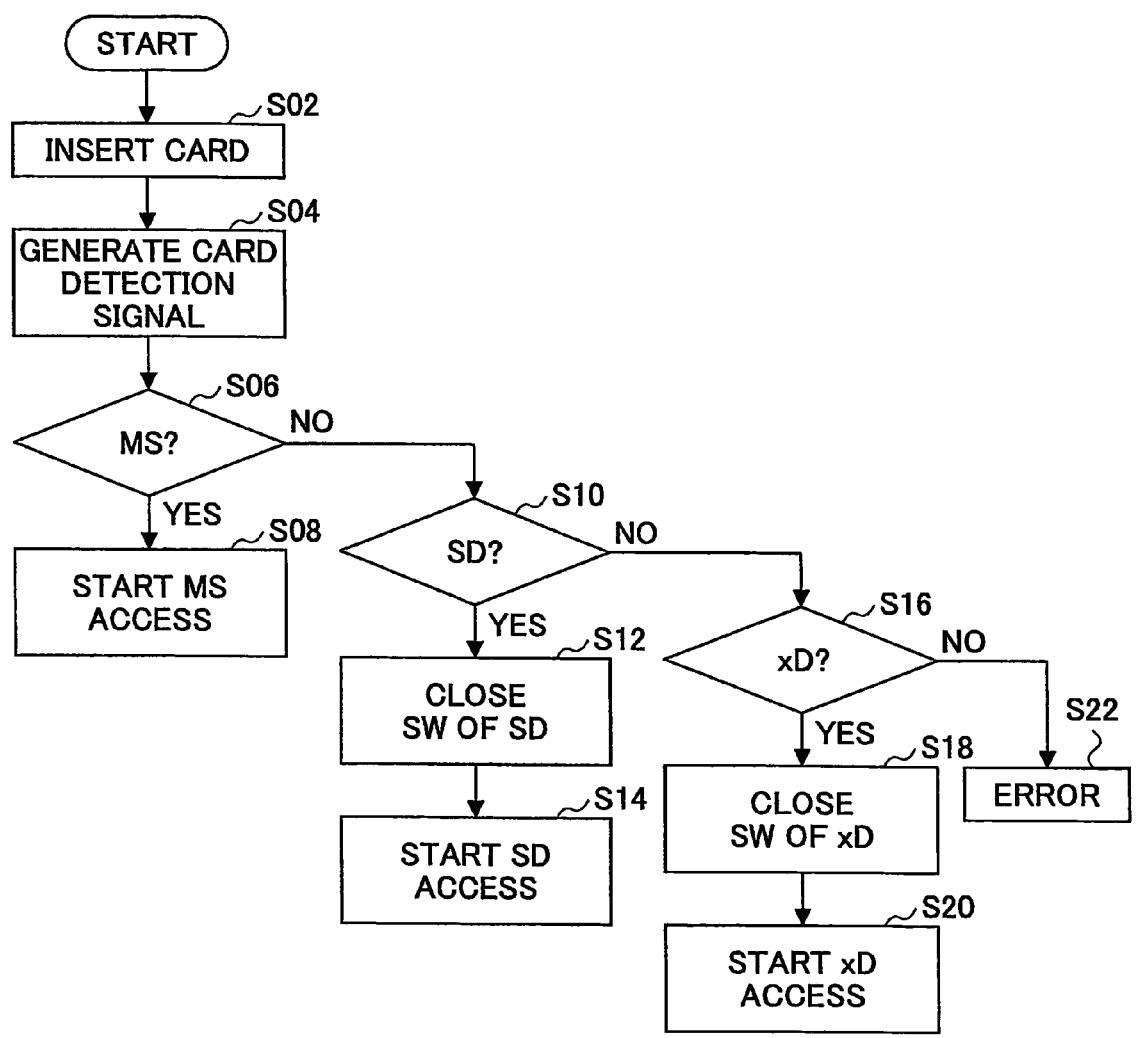
FIG. 4 is a flowchart illustrating a process flow for realizing data access starting from the point at which a small memory card is inserted into the connector of FIG. 3.

FIG. 4 is a flowchart showing a process flow for realizing data access starting from the point at which a small memory card 4 is inserted into the combo connector 3 of FIG. 3.

According to FIG. 4, when a small memory card 4 is inserted (S02), a card detection signal (CD#) is generated (S04). In this case, one of the card detection signals MSCD#, SDCD#, or xDCD# changes from 'H' to 'L' (i.e., one of the signals is asserted).

Then, at the small memory card controller 1, it is determined whether the inserted card corresponds to an MS based on the asserted card detection signal (S06). When it is determined that the asserted card detection signal corresponds to the signal MSCD#, an accessing process with respect to the MS is started by the small memory card controller 1 (S08).

On the other hand, when it is determined that the asserted card detection signal does not correspond to the signal MSCD#, it is determined whether the asserted card detection signal corresponds to the signal SDCD#; namely, the small memory card controller 1 determines whether the inserted memory card corresponds to an SD (S10). When it is determined that the asserted card detection signal corresponds to the signal SDCD#, the isolator (SW) 5 at the SD data signal buses is closed (S12), and an accessing process with respect to the SD is started by the small memory card controller 1 (S14).

On the other hand, when it is determined that the asserted card detection signal does not correspond to the signal SDCD#, it is determined whether the asserted card detection signal corresponds to the signal xDCD#; namely, the small memory card controller 1 determines whether the inserted memory card corresponds to an xD (S16). When it is determined that the asserted card detection signal corresponds to the signal xDCD#, the isolator (SW) 5 at the xD power circuit signal buses is closed (S18), and an accessing process with respect to the xD is started by the small memory card controller 1 (S20). When it is determined that the asserted card detection signal does not correspond to the signal xDCD#, the small memory card controller 1 conducts an error process (S22). The error process may correspond to a process of rejecting data access, for example.

Figure 5A:
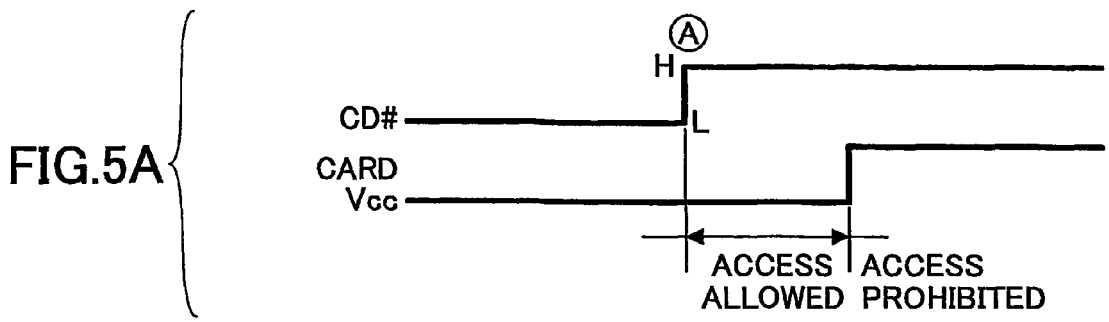
FIGS. 5A~5C are diagrams showing changes in a card detection signal and a card power voltage (power circuit signal) occurring when a small memory card is detached from a combo connector.
Figure 5B:
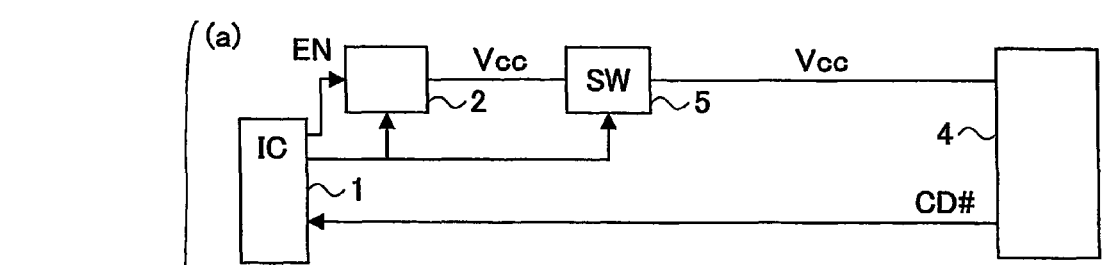
Figure 5B:
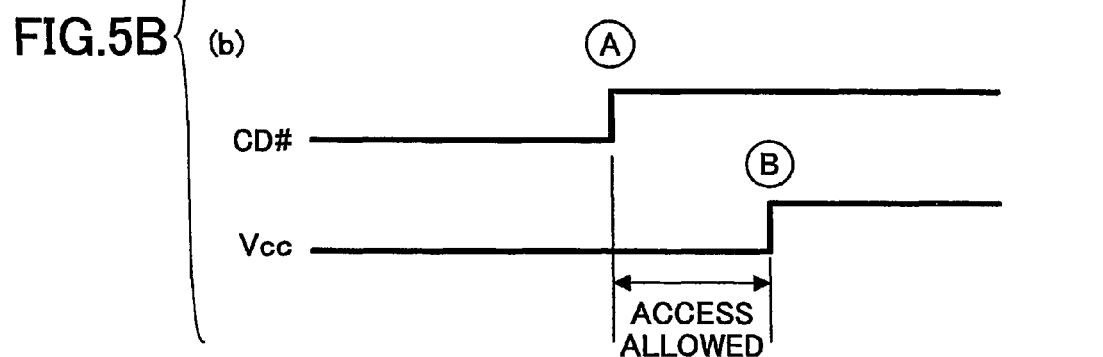
Figure 5C:
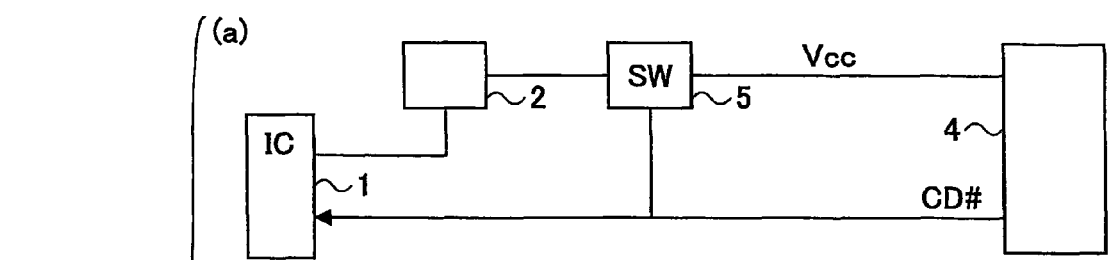
Figure 5C:
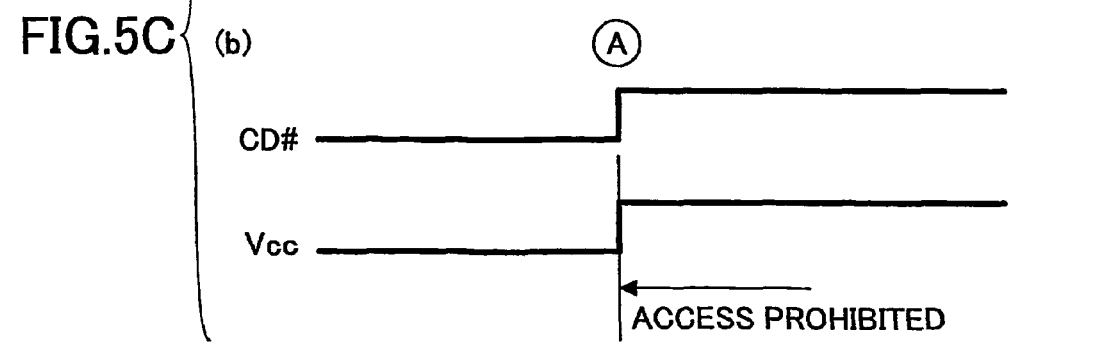

FIGS. 5A~5C are diagrams illustrating changes in a card detection signal and a card power voltage (i.e., power circuit signal Vcc) occurring when a small memory card 4 is removed from a combo connector. FIG. 5A illustrates changes in the card detection signal and card power voltage according to a prior art example. In FIG. 5A, the card is removed at time A, and the card detection signal (CD#) is changed from 'L' to 'H'. It is noted that generally, even when the CD# is changed from 'L' to 'H', chattering (i.e., additional connection) occurs between the small memory card 4 and the small memory card controller 1 or the combo connector 3. Accordingly, a chattering prevention counter is provided at the small memory card controller 1, and the card power voltage (power circuit signal Vcc) is controlled to allow data access for a predetermined period of time after the CD# is changed from 'L' to 'H'.

According to an embodiment of the present invention, when the inserted memory card 4 corresponds to an xD, and the xD is removed so that the xDCD# is changed from 'H' to 'L', the isolator (SW) 5 at the power circuit signal buses is configured to be opened directly in response to the change of xDCD#. According to one embodiment, the time period for allowing data access that is set for the card power voltage (Vcc) by the chattering prevention counter in the example of FIG. 5A may be reflected in the change of the card power voltage (Vcc) in a manner as is illustrated in FIG. 5B. In FIG. 5B (a), the small memory card controller 1 controls a power circuit 2 and the isolator (SW) 5 to secure an access period as is shown in FIG. 5B (b) upon detecting a change in the card detection signal xDCD# from 'L' to 'H'.

According to another embodiment, in FIG. 5C, the small memory card controller 1 controls the card power voltage (power circuit signal Vcc) to be immediately changed to prevent data access as is shown in FIG. 5C (b) upon detecting a change in the card detection signal xDCD# from 'L' to 'H'.

It is noted that in the above described embodiments, the combo connector 3 corresponds to a connector that is adapted to be connectable to an MS, an SD, an xD, or an MS Duo adapter. However, the present invention is not limited to such an embodiment, and for example, the present invention may be applied to connectors (and access apparatuses) that are adapted to be connected to other types of small memory cards as well as connectors (an access apparatuses) that are adapted to be connected to a portion of the types of small memory cards described above.

Also, it is noted that in the embodiments described above, an isolator such as an analog switch circuit is provided as means for opening and closing a signal bus. However the means for opening and closing a signal bus is not limited to the analog switch circuit, and other means for isolating and connecting a signal bus may be used as well.

Further, it is noted that the combo connector 3, the small memory card controller 1, the power circuit 2, the isolator 5, and the signal buses that are described in relation to the above preferred embodiments may be implemented in an electronic apparatus such as a personal computer. For example, the combo connector 3 may be provided at a side portion of a personal computer box structure as one of plural input/output terminals of the personal computer, the small memory card controller 1 may be integrated within the personal computer box structure, and the signal buses, the power circuit, and the isolator may be provided inside the personal computer box structure.

The invention claimed is:

1. A card access apparatus that is adapted to be connected to a plurality of types of cards, the apparatus comprising:
    a single slot adapted to accommodate the plurality of types of cards, said slot comprising:
        a plurality of connection points adapted for the respective types of cards; and
        a plurality of signal buses that connects the connection points to a card control unit;

wherein when one type of the types of cards is inserted in the slot and connected to one of the connection points adapted for said one type of the types of cards, the one type of card including a metal plate on an external surface of the card having an insulator coating applied thereon, at least one of the signal buses connected to at least one of the connection points adapted for at least one other type of the types of cards is electrically isolated from said at least one of the connection points, and wherein data is exchanged between the inserted card and the slot through the one of the connection points adapted for said one type of the types of cards in an opening part in the slot, the opening part having the plurality of connection points.

2. The card access apparatus as claimed in claim 1, further comprising:

an isolator that is configured to electrically isolate said at least one of the signal buses connected to said at least one of the connection points adapted for said at least one other type of the types of cards from said at least one of the connection points;

wherein when said one type of the types of cards is not connected to said one of the connection points adapted for said one type of the types of cards, the isolator is arranged to be in an open state.

3. The card access apparatus as claimed in claim 2, wherein when said one type of the types of cards is connected to said one of the connection points adapted for said one type of the types of cards, the isolator is arranged to be in a closed state.

4. The card access apparatus as claimed in claim 3, wherein when said one type of the other type of the types of cards is connected to said one of the connection points adapted for said one type of the other types of cards, the isolator is arranged to be in an open state.

5. The card access apparatus as claimed in claim 2, wherein the isolator realizes a separate circuit with respect to the card control unit.

6. The card access apparatus as claimed in claim 2, wherein the isolator is integrated into the card control unit.

7. The card access apparatus as claimed in claim 2, wherein the isolator is provided for said at least one of the signal buses connected to said at least one of the connection points adapted for said at least one other type of the types of cards when there is a risk of a short circuit occurring at said at least one of the connection points adapted for said at least one other type of the types of cards upon connecting said one type of the types of cards to said one of the connection points adapted for said one of the types of cards.

8. The card access apparatus as claimed in claim 2, wherein said one type of the types of cards is connected to said one of the connection points adapted for said one type of the types of cards by a connecting unit that includes a metal plate having an insulator coating applied thereon; and the isolator is provided for said at least one of the signal buses connected to said at least one of the connection points adapted for said at least one other type of the types of cards when there is a risk of a short circuit occurring at said at least one of the connection points adapted for said at least one other type of the types of cards upon connecting said one type of the types of cards to said one of the connection points adapted for said one type of the types of cards.

9. The card access apparatus as claimed in claim 2, wherein the signal buses include a plurality of card detection signal buses for the respective types of cards; and when at least one card detection signal of at least one of the card detection signal buses for at least one of the types of cards is set to a non-detection state, and the isolator is provided for at least one of the signal buses associated with said at least one of the types of cards, the isolator is arranged to be in an open state.

10. The card access apparatus as claimed in claim 9, wherein when said at least one card detection signal of said at least one of the card detection signal buses is set to a card detection state, the isolator is arranged to be in a closed state.

11. The card access apparatus as claimed in claim 9, wherein the signal buses include at least one power circuit signal bus, and the isolator is provided for said at least one power circuit signal bus; and the card control unit controls a power circuit and the isolator to secure a predetermined access period upon detecting a card detection signal state change from a card detection state to a non-detection state in one of the card detection signal buses.

12. The card access apparatus as claimed in claim 9 wherein the signal buses include at least one power circuit signal bus, and the isolator is provided for said at least one power circuit signal bus; and the card control unit controls a power circuit to prevent access upon detecting a card detection signal state change from a card detection state to a non-detection state in one of the card detection signal buses.

13. An electronic apparatus comprising:

a card access apparatus that is adapted to be connected to a plurality of types of cards, the card access apparatus comprising:

a single slot adapted to accommodate the plurality of types of cards, said slot comprising:

a plurality of connection points adapted for the respective types of cards; and a plurality of signal buses that connects the connection points to a card control unit;

wherein when one type of the types of cards is inserted in the slot and connected to one of the connection points adapted for said one type of the types of cards, the one type of card including a metal plate on an external surface of the card having an insulator coating applied thereon, at least one of the signal buses connected to at least one of the connection points adapted for at least one other type of the types of cards is electrically isolated from said at least one of the connection points, and wherein data is exchanged between the inserted card and the slot through the one of the connection points adapted for said one type of the types of cards in an opening part in the slot, the opening part having the plurality of connection points.

* * * * *